United States Patent [19]

Rosof

[11] 4,138,249

[45] Feb. 6, 1979

[54] PROCESS FOR RECOVERING VALUABLE METALS FROM SUPERALLOY SCRAP

[75] Inventor: Barry H. Rosof, Indianapolis, Ind.

[73] Assignee: Cabot Corporation, Boston, Mass.

[21] Appl. No.: 909,730

[22] Filed: May 26, 1978

[51] Int. Cl.$^2$ .......................... C22B 23/04; C22B 7/04
[52] U.S. Cl. ........................................... 75/103; 75/48; 75/63; 75/82; 75/119
[58] Field of Search ...................... 75/103, 119, 63, 82, 75/48

[56] References Cited

U.S. PATENT DOCUMENTS

| | | |
|---|---|---|
| 3,649,487 | 3/1972 | Aue et al. .............................. 204/112 |
| 3,753,686 | 8/1973 | Wilder et al. ............................. 75/21 |
| 3,788,841 | 1/1974 | Agarwal et al. ....................... 75/103 |
| 3,849,269 | 11/1974 | Hartwig et al. .................... 75/101 R |
| 3,880,651 | 4/1975 | Queneau et al. ......................... 75/82 |
| 3,967,957 | 7/1976 | Fonseca ................................. 75/103 |
| 3,975,190 | 8/1976 | Van der Meulen et al. ...... 75/119 X |

*Primary Examiner*—G. Ozaki
*Attorney, Agent, or Firm*—Jack Schuman; Barry R. Blaker; Lawrence A. Chaletsky

[57] ABSTRACT

Disclosed is a method for recovering valuable metals from scrap including the steps of melting the initial scrap feed, carburizing the melt, solidifying the carburized melt, and recovering the valuable metals from the resulting material by ammoniacal leaching thereof.

13 Claims, 1 Drawing Figure

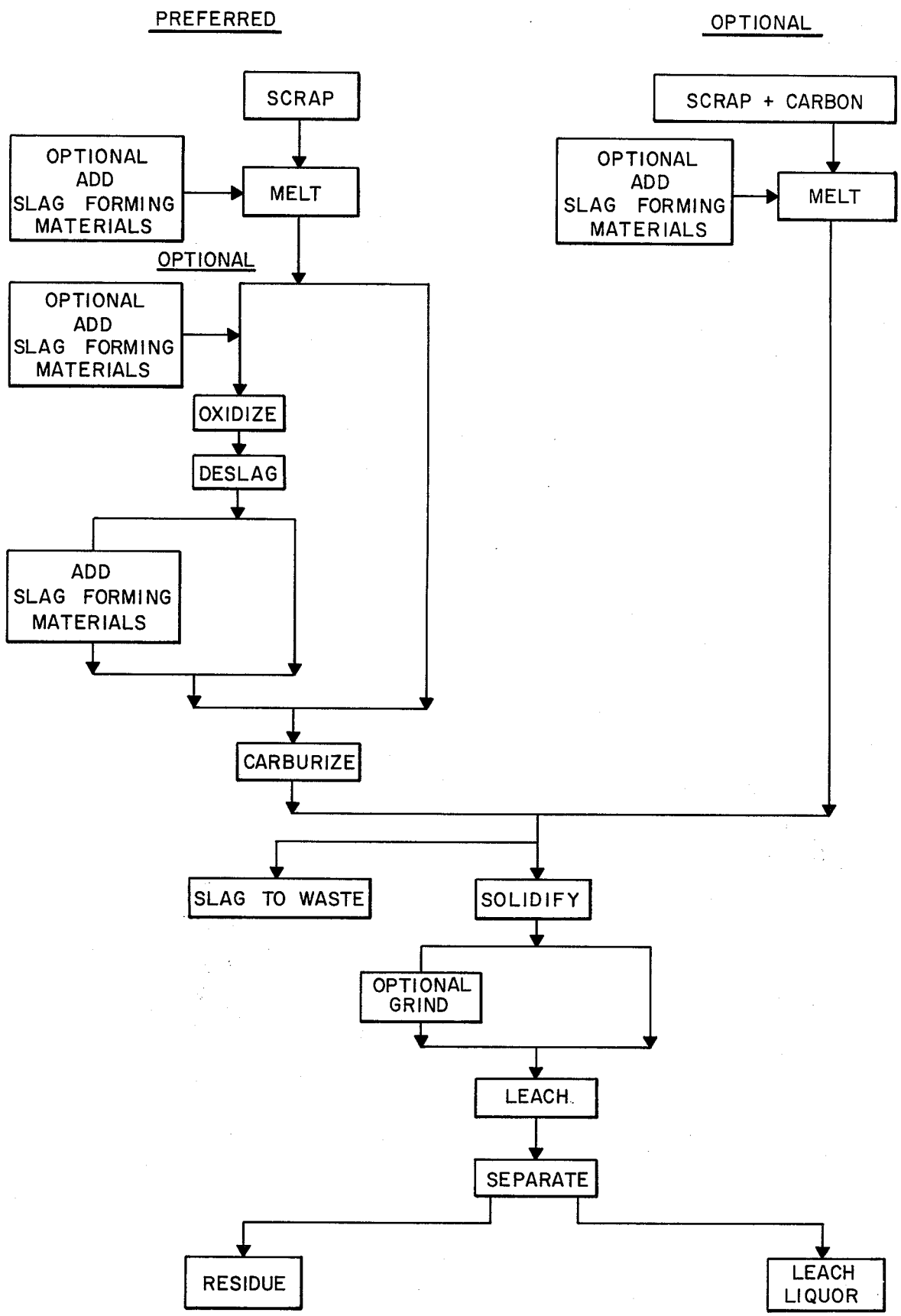

PROCESS FOR RECOVERING VALUABLE METALS FROM SUPERALLOY SCRAP

FIELD OF THE INVENTION AND PRIOR ART

The present invention relates generally to dissolution of certain metal scraps and is more particularly concerned with an ammoniacal leach method for dissolving scraps containing the combination of (a) a metal chosen from the group consisting of cobalt, nickel and mixtures thereof and (b) a refractory metal chosen from the group consisting of molybdenum, chromium, tungsten and mixtures thereof.

In recent years the use of so-called "superalloys" has burgeoned due to the need for wares having the special properties afforded by these materials, such as high temperature strength, high temperature oxidation resistance, corrosion resistance and the like. As the use of these superalloys grows so does the amount of scrap and other wastes containing them. The usual superalloy scraps include such physically diverse items as spent and off-quality wares, turnings, grindings, pouring skulls, mold gates, flashings and waste products such as slimes, sludges and slags. Accordingly, for purposes of the present invention, the term "scrap" is intended to include, but not be limited to, any and all of the various forms mentioned above.

In view of the fact that scraps of the foregoing types contain metals of substantial commercial value, there presently exists a clear need for suitable methods by which such scraps may be treated so as to recover at least certain of the metal values therefrom in commercially usable forms. Those scraps comprising substantial quantities of the superalloys usually contain significant quantities of nickel and/or cobalt and various schemes have been proposed by which to recover these metal values from such scraps.

THE PRIOR ART

For instance, U.S. Pat. No. 3,649,487, Mar. 14, 1972, to Aue et al., discloses a process by which a metal scrap containing the combination of at least one base metal chosen from the group consisting of iron, nickel, cobalt and copper and at least one high melting point metal chosen from the group consisting of chromium, molybdenum and tungsten is electrolytically treated so as to recover the base metal values therefrom. Said method involves pretreatment of the metal scrap to convert the aforesaid high melting point metals to their carbides, borides, silicides, nitrides and/or phosphides. Then, the thusly pretreated metal scrap is anodically dissolved, at a potential at below 4 volts, in a neutral or acidic electrolyte composed of salts of non-oxidizing acid. By virtue of the combination of the pretreating step and the maintenance of a low potential during electrolysis the dissolution of the metal scrap is disclosed to proceed in a manner whereby the base metals are dissolved and one or more thereof are ultimately deposited at the cathode while the high melting point metals remain essentially undissolved and are retained at the anode in the form of an anode slime or skeleton.

The above-mentioned process is possessed of certain disadvantages which tend to mitigate against widespread commercial use thereof. For instance, the economics thereof are believed to be unattractive due to its electric power consumption requirements and due to the attendant high capital and operating costs usually associated with the construction and operation of electrolysis cells.

In accordance with the present invention, however, it has now been discovered that substantially selective and acceptably rapid dissolution of an initial scrap feed containing the combination of (a) at least one metal chosen from the group consisting of nickel, cobalt and mixtures thereof and (b) at least one refractory metal chosen from the group consisting of molybdenum, tungsten, chromium and mixtures thereof can be had by ammoniacal leaching of specially prepared scrap.

OBJECTS OF THE INVENTION

It is, therefore, a principal object of the present invention to provide a novel ammoniacal leach method for the dissolution of initial scrap feeds containing the combination of (a) at least one metal selected from the group consisting of cobalt, nickel and mixtures thereof and (b) at least one refractory metal selected from the group consisting of chromium, molybdenum, tungsten and mixtures thereof wherebythe nickel and/or cobalt values of the scrap feeds are predominantly passed into solution in the ammoniacal leach liquor while the refractory metal values thereof are predominantly retained in the leach residue.

It is another object of the invention to provide an ammoniacal leach method for the dissolution of initial scrap feeds of the foregoing type and which feeds comprise alloys which are not normally soluble in ammoniacal solutions.

It is still another object of the invention to provide an ammoniacal leach method for the dissolution of initial scrap feeds of the foregoing type whereby the leaching treatment may be accomplished without the need for the provision of extraordinary conditions, whereby the nickel and/or cobalt values of the scrap feeds are predominantly dissolved and whereby the resulting leach liquor may be treated to win said nickel and/or cobalt values therefrom.

Other objects and advantages of the present invention will, in part, appear hereinafter and will, in part, be obvious.

SUMMARY OF THE INVENTION

In accordance with the present invention, an initial scrap feed containing the combination of (a) at least one metal selected from the group consisting of nickel, cobalt or mixtures thereof and (b) at least one refractory metal selected from the group consisting of chromium, molybdenum, tungsten and mixtures thereof is melted, an effective amount of carbon added to the melt and the carbon-containing melt solidified, thereby causing the group (b) refractory metal content of the initial feed to form carbides. This carburized scrap feed is then dissolved in an ammoniacal leach liquor whereby the nickel and/or cobalt values of the feed pass predominantly into the leach liquor while the carburized group (b) refractory metal values thereof remain predominantly as residue. The resulting dissolution products, comprising the leach liquor and the leach residue, may be separated from one another and each of said products thereafter treated in order to win desired metal values therefrom.

THE DRAWING

The drawing hereof is a schematic, diagrammatic flow sheet illustrating the method of the invention along with certain preferred and optional embodiments thereof.

DESCRIPTION OF PREFERRED EMBODIMENTS

As mentioned previously, the initial scrap feed in the practice of the present invention generally includes any metal-containing scrap containing the combination of:

a. at least one metal selected from the group consisting of nickel, cobalt and mixtures thereof; and b. at least one refractory metal selected from the group consisting of chromium, molybdenum, tungsten and mixtures thereof.

The initial scrap feeds of interest can include a variety of compositions either through design or chance and can comprise, for example, mechanical mixtures of one or more of the following: nickel base alloys, cobalt base alloys, steels and iron alloys, magnet alloys, nickel-copper alloys, aluminum alloys and the like.

Of special interest are those initial scrap feeds containing substantial quantities of cobalt or nickel base alloys, particularly the so-called "superalloys". Superalloys normally have relatively low iron contents of less than about 40 weight percent and are believed to be usually resistant to attack and dissolution by ammoniacal leach liquors under non-extraordinary conditions. Of particular interest are those initial scrap feeds which, upon melting, yield a molten mass comprising, just prior to solidification, a minimum of about twenty-five weight percent nickel plus cobalt and at least eight weight percent of one or more of the group (b) refractory metals as previously defined.

It should be recognized, of course, that the initial scrap feeds can also comprise various metal or metalloid values (in elemental or chemically combined forms such as oxides) in addition to the specific metals of groups (a) and (b) required in the practice of the invention. Thus, suitable scrap feeds may also contain, for example, one or more elements, alloys or compounds of: magnesium, iron, boron, aluminum, yttrium, lanthanum, silicon, titanium, zirconium, hafnium, vanadium, columbium, manganese, copper and the like.

Depending upon the precise nature of the initial scrap feed, its composition and the source of its components, it is also contemplated that practice of the present invention can often be beneficially affected when preliminary to treatment in accordance with the invention, the scrap feed is subjected to conventional cleansing procedures such as degreasing and grit removal.

Carburization of the group (b) refractory metal content of a suitable initial scrap feed may be had by melting the feed, with or without a slag, by any suitable process such as electric arc furnace or induction furnace melting. Carbon may thereafter be introduced into the molten scrap bath by any suitable method, such as by the injection of graphite or coke into the molten bath using an inert gas carrier such as argon. Alternatively, the carbon addition can also be carried out by adding carbon in a teeming ladle during tapping of the molten scrap. Yet another generally suitable carbon addition technique resides in providing sufficient carbon in the initial scrap feed prior to melting thereof. This can be done, for instance, by adding carbon to the initial feed prior to melting or by appropriate preselection and blending of two or more different scraps wherein one or more of said scraps already contains sufficient carbon to result in carburization of the group (b) refractory metals content of the resulting composite initial scrap feed.

Employing any of these techniques, therefore, there results a molten metal bath containing carbon dissolved therein. Carburization of the group (b) refractory metals, of course, occurs upon solidification of this carbon-containing molten bath, the carbides forming as a discrete phase within the group (a) matrix metal.

Solidification of the molten bath may be conducted in combination with a teeming step, such as, pigging or ingot casting. However, it is generally convenient and economic to solidify the heat by conventional shotting or atomization techniques whereby the solidified carburized metal feed is rendered into at least relatively small particulate form whereby substantial contact area of the solidified carburized feed is thereby provided for the subsequent ammoniacal leaching step. This embodiment of the invention tends to improve the efficiency of the leaching step. The particular solidification technique chosen will usually depend upon available equipment, economics and subsequent processing steps contemplated. It is additionally contemplated that, before leaching, one may also reduce the particle size of the solidified carburized feed by grinding or any other comminution method known in the art.

Important roles played by carburization of the group (b) refractory metals in the practice of the invention are (1) to convert the chromium, molybdenum and tungsten refractory metal values of the initial scrap feed into one or more discrete carbide phases which are predominantly insoluble in the subsequent ammoniacal leach treatment, and (2) at least in the case of those initial scrap feeds containing one or more alloys which are normally highly resistant to attack and solution by ammoniacal leach liquors, to fundamentally alter the character of such alloys as to render the matrix phase cobalt and nickel values thereof soluble in the ammoniacal leach liquor to be subsequently contacted therewith. Accordingly, the minimum amount of carbon effective to produce these two results represents the minimum quantity of carbon to be present in the molten scrap bath.

Although there is no intent to be bound by the following discussion, it is believed that the minimum effective quantity of carbon required to be present in the molten metal bath for any given set of circumstances will be governed, at least in large measure, by the overall composition of the starting material, particularly the group (b) refractory metal contents thereof and the particular ammoniacal leach liquor and leach method contemplated for dissolution of the carburized product. For instance, it is believed that the greater the overall group (b) refractory metals content of the starting scrap, the larger the quantity of carbon required. Bearing the above in mind, therefore, a carbon content of the carburized solidified scrap feed of between 0.5 and 6.0 weight percent carbon will usually be found to be effective within the terms of the invention.

For purposes of the present invention, it should be noted and understood that carburization of the scrap starting material need not result in the conversion of the refractory metals content of group (b) solely to their simple corresponding carbides but also will usually result in at least some conversion of said refractory metals to more complex carbide forms. For instance, where chromium, molybdenum, nickel and cobalt are present in the scrap feed, at least one of the various types of carbides containing two or more of these elements, in combination, may be formed.

As mentioned previously, the initial scrap feed can also contain significant oxidized or oxidizable metal values of metals other than those specifically required thereof such as, aluminum, silicon, magnesium, boron, yttrium, lanthanum, titanium, zirconium, hafnium, vanadium, columbium, tantalum and manganese. The winning of these oxidizable metal values may be undesired due to their relatively low commercial worth, their presence in insufficient concentration to be of commercial interest or the presence of which metal values in the ammoniacal leach liquor or leach residue products of the invention could lead to difficulties in whatever subsequent treatments or winning processes may be contemplated for said leach liquor or leach residue products. Accordingly, in a preferred embodiment of the invention, the presence of at least some of these oxidizable metal values in the solidified carburized scrap feed is avoided or diminished by one or more optional oxidizing steps accomplished after the melting step and preliminary to the carburizing step. Said oxidizing step may be performed by any suitable technique conventional in the art. For example, oxygen may be injected into the molten initial scrap feed bath via a lance and in the presence of a lime-bearing slag. Employing this technique the oxidizable metal values migrate from the molten scrap and are combined into the slag. There, they may be removed by slagging-off. If desired, a new protective slag may then be provided prior to commencement of the carburizing step.

Dissolution of the carburized and solidified scrap feed is achieved by leaching of said feed with substantially any ammoniacal leach liquor of sufficient corrosivity to attack and dissolve the group (a) metals of said scrap. Contact of the leach liquor with the carburized scrap may desirably be undertaken under conditions of agitation, elevated temperature and/or elevated pressure so as to optimize the rate of dissolution of the group (a) metal values.

For illustrative purposes concerning the practice of the present invention and certain of the preferred embodiments thereof, there follows a non-limiting example.

EXAMPLE

Ninety pounds of scrap, the metallic content of which was composed entirely of an alloy composition conforming to ASME Boiler Code Case No. 1410-4, was melted by charging the majority of the scrap charge into an induction furnace, applying power to the furnace and adding about 1.7 pounds of nickel oxide to the melting charge. Upon completion of the melting of this initial scrap charge the remaining portion of the scrap was added, melted down and a chemistry sample thereof, hereinafter Sample A, obtained. Thereafter, an additional 1.7 pounds of nickel oxide was charged to the molten scrap and, after a brief hold of about eight minutes, the oxide slag removed from the surface of the melt. Another chemistry sample of the molten scrap, hereinafter Sample B, was obtained and the bath temperature was determined to be 2720° F. The temperature of the bath was thereafter maintained within the range of 2540 and 2735° F. for the balance of the heat.

Carburization of the molten scrap was undertaken by incremental additions of graphite. Subsequent to each graphite addition an approximately five-pound sample of the metal was obtained by casting thereof into a graphite mold. In this manner, fourteen cast samples were obtained and, subsequent to the last cast sample, another chemistry sample of the molten bath, Sample C, was obtained.

The composition of each of the chemistry samples was determined analytically, the results of which analyses appear in Table 1, following:

TABLE 1

| | COMPOSITIONS (Values in Weight %) | | |
| --- | --- | --- | --- |
| | CHEMISTRY SAMPLE IDENT. | | |
| Element | A | B | C |
| Al | 0.11 | 0.02 | 0.01 |
| B | 0.002 | 0.002 | 0.002 |
| C | 0.055 | 0.054 | 3.90 |
| Co | 2.14 | 2.15 | 2.17 |
| Cr | 15.29 | 15.24 | 13.90 |
| Cu | 0.12 | 0.15 | 0.11 |
| Fe | 5.97 | 6.04 | 6.21 |
| Mg | 0.005 | 0.005 | 0.005 |
| Mn | 0.47 | 0.50 | 0.35 |
| Mo | 15.48 | 15.51 | 14.14 |
| Ni | 55.15 | 55.23 | 53.98 |
| P | 0.011 | 0.01 | 0.005 |
| S | 0.002 | 0.002 | 0.003 |
| Si | 0.05 | 0.07 | 0.02 |
| Ti | 0.01 | 0.01 | 0.01 |
| V | 0.19 | 0.20 | 0.13 |
| W | 3.71 | 3.73 | 4.19 |
| Zr | 0.01 | 0.01 | 0.01 |

Of the fourteen cast samples obtained, the thirteenth, whose carbon content was analyzed to be 3.59 weight percent, was selected for treatment by ammoniacal leaching thereof. A rod shaped specimen, hereinafter Specimen C, was machined from this cast sample for use in the leaching step. A control specimen, hereinafter Specimen O, was machined from a wrought piece of the same alloy employed to make up the initial scrap feed. Its composition is reported in Table 2.

TABLE 2

| COMPOSITION OF SPECIMEN O (Values in Weight %) | |
| --- | --- |
| Element | |
| AL | 0.17 |
| B | 0.002 |
| C | 0.006 |
| Co | 2.02 |
| Cr | 15.09 |
| Cu | 0.06 |
| Fe | 5.53 |
| Mg | 0.003 |
| Mn | 0.44 |
| Mo | 15.82 |
| Ni | 56.88 |
| P | 0.011 |
| S | <0.002 |
| Si | 0.02 |
| Ti | <0.01 |
| V | 0.13 |
| W | 3.58 |

The surfaces of both specimens were prepared by first grinding on a 120-grit belt to clean the surface. The specimens were then cleaned in distilled water and dried for 40 minutes at 200° F. in an oven. Specimens C and O weighed 20.6455 grams and 22.5107 grams, respectively.

An ammoniacal leach liquor was prepared by charging 148.3 grams of $(NH_4)SO_4$, 73.6 grams of NaOH and 500 ml of water into a 1000 ml flask. The resulting pH was 10.3.

The flask was then equipped with a sparge tube and the ammoniacal leach liquor contents thereof heated to and maintained at about 150° F. along with slow oxygen sparging thereof. Upon attainment of temperature, Specimens C and O were placed in the leach liquor and maintained immersed therein for a period of about 42½ hours. Aside from an aggregate time of somewhat more than two hours, the oxygen was continuously sparged through the solution.

After being removed from the solution, the specimens were rinsed in distilled water, rinsed in alcohol, again rinsed in distilled water, dried for 40 minutes at 200° F. in an oven and weighed.

The extent of the dissolution of each of the specimens achieved by the foregoing ammoniacal leaching treatment thereof was determined by weight loss. The weights of Specimens C and O, after the leaching step, were determined to be 20.6336 grams and 22.5093 grams, respectively. Thus, in the case of the control specimen, Specimen O, the weight loss due to leaching was only 0.0014 gram. In the case of Specimen C, said weight loss was determined to be 0.0119 gram. Accordingly, treatment of the initial scrap feed in accordance with the invention resulted in an approximately eight-and-one-half-fold improvement in the quantity of metal dissolved over that of the untreated scrap.

Subsequent to the leaching step the resulting leach liquor can be physically separated from the leach residue by employment of any suitable conventional solid/liquid separation technique such as centrifugation, filtration, decantation and the like. Thereafter, the leach liquor product can usually be employed as an original or adjunctive feedstock in various conventional nickel and cobalt metal ore refining or winning processes known in the art.

For instance, in *The Winning of Nickel*, Joseph R. Boldt, Jr., edited by P. Queneau, D. Van Nostrand Company, Inc., 1967, pages 299–315, specifically incorporated herein by reference, there is disclosed a commercial process for the winning of nickel as practiced at the Fort Saskatchewan refinery of Sherritt Gordon Mines, Limited. Said process is based upon multi-stage ammoniacal leaching of the nickel-containing sulfide ore, pentlandite, whereby nickel and copper values are leached into ammoniacal leach solution. The nickel- and copper- containing leach solution is boiled to recover a part of the ammonia and to precipitate copper values as sulfide. The copper-free leach solution is then treated to convert incompletely oxidized and unsaturated sulfur species to sulfate ions. The dissolved nickel values are then converted to elemental nickel powder by direct reduction with hydrogen. In accordance with the present invention, it is contemplated that the carburized scrap and/or leach liquor products thereof can be integrated into refining processes of the type outlined above. For example, provided that deleterious substances are either not present or are first removed, the carburized scrap product of the invention can be admixed with the sulfide ore to form an ore/carburized scrap mixture for suitable use as a composite feedstock in the ammoniacal leaching step of the refining process. Also, a separate ammoniacal leaching treatment of the carburized initial scrap feed can be undertaken and, if present, deleterious impurities removed from the resulting leach liquor, said leach liquor thereafter being introduced, as adjunctive feedstock, into one or more of the stages of the refining process existing downstream from the ore leaching step. Thus, the ammoniacal leach liquor product attained as a result of the practice of the present invention can be combined with the liquor fraction arising from the sulfide ore leaching step, the combined leach fractions thereafter being treated, together, to recover nickel and at least a portion of the ammonia therefrom.

Accordingly, it is intended and should be understood that the foregoing description and examples are illustrative in nature and that, therefore, numerous changes can be made in the materials, proportions and conditions specifically set forth therein without departing from the essential spirit of the invention as defined in the appended claims.

What is claimed is:

1. A method for treating certain metal scraps which comprises:

providing an initial scrap feed containing the combination of (a) at least one metal selected from the group consisting of nickel, cobalt and mixtures thereof, and (b) at least one refractory metal selected from the group consisting of chromium, molybdenum, tungsten and mixtures thereof;

melt carburizing said feed sufficiently to at least predominantly insolubilize the metals of group (b) with respect to the ammoniacal leach step below and to render the group (a) metals of those alloys contained in said feed which are resistant to solution in ammoniacal leach liquor soluble in said ammoniacal leach step; and leaching the melt carburized feed with an ammoniacal leach liquor having dissolving power for the metals of group (a), whereby said metals of group (a) pass predominantly into solution in said liquor while the metals of group (b) remain predominantly as undissolved leach residue.

2. The method of claim 1 wherein said initial scrap feed, in the molten state, comprises a minimum of about 25 weight percent of the metal of group (a) and at least eight weight percent of the refractory metalgroup (b).

3. The method of claim 1 wherein said scrap feed comprises nickel base alloy.

4. The method of claim 3 wherein said nickel base alloy is a super alloy.

5. The method of claim 1 wherein said scrap feed comprises cobalt base alloy.

6. The method of claim 5 wherein said cobalt base alloy is a superalloy.

7. The method of claim 1 wherein said melt carburizing is undertaken to the extent that the resulting melt carburized scrap feed has a carbon content of between about 0.5 and about 6.0 weight percent.

8. The method of claim 1 wherein carbon for the carburizing step is added to said scrap feed prior to melting thereof.

9. The method of claim 8 wherein carbon for the carburizing step is provided by mixing a scrap containing insufficient carbon for carburizing thereof with another scrap containing excess carbon for carburizing thereof, thereby to provide a composite initial scrap feed containing sufficient carbon for carburizing thereof.

10. The method of claim 1 wherein, prior to the carburizing step, oxidizable metal values are removed from the initial scrap feed by oxidation treatment thereof.

11. The method of claim 10 wherein said oxidation treatment comprises melting the scrap feed and slagging the molten feed with an oxidizing slag.

12. The method of claim 1 wherein said oxidation treatment comprises melting the scrap feed and introducing oxygen thereinto.

13. The method of claim 1 wherein the ammoniacal leach liquor product of the leaching step is treated to recover dissolved group (a) metal values therefrom.

* * * * *